No. 852,224. PATENTED APR. 30, 1907.
P. T. DODGE.
METHOD OF PRODUCING LOGOTYPES.
APPLICATION FILED DEC. 20, 1906.
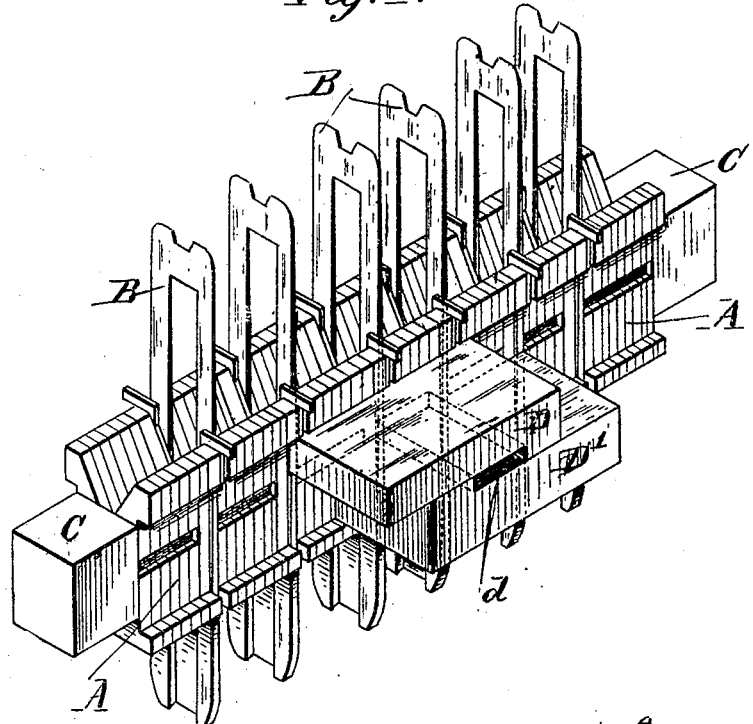
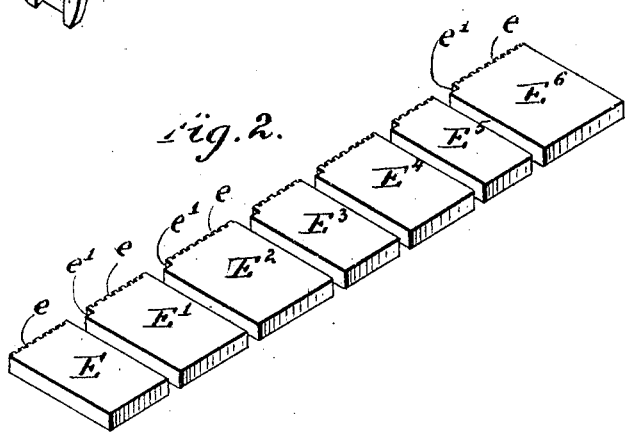
Witnesses
Inventor
Philip T. Dodge

UNITED STATES PATENT OFFICE.

PHILIP T. DODGE, OF WASHINGTON, DISTRICT OF COLUMBIA, ASSIGNOR TO MERGENTHALER LINOTYPE COMPANY, A CORPORATION OF NEW YORK.

METHOD OF PRODUCING LOGOTYPES.

No. 852,224.  Specification of Letters Patent.  Patented April 30, 1907.

Application filed December 20, 1906. Serial No. 348,820.

*To all whom it may concern:*

Be it known that I, PHILIP T. DODGE, of Washington, District of Columbia, have invented a new and useful Improvement in Methods of Producing Logotypes, of which the following is a specification.

My invention has in view a simple and rapid method of producing logotypes in justified lines of predetermined length; in other words, of producing logotypes having integral therewith spaces of such width that when the logotypes are assembled side by side in line the line will have the exact length required. To this end, I compose and justify the line consisting of matrices representing the individual characters and spacers, between the word groups of matrices, of such width that they will fill out or justify the line to the predetermined length. I bring this continuous or integral line and an adjustable mold together repeatedly in such relations that the mold will cast from each word group of matrices and the adjacent spacers a logotype of corresponding length, the matrices and spacers being thus utilized to determine the length of the logotypes and spaces so that they will justify and assemble in series.

The matrices may be of any suitable form, and the intermediate spacers may be either of the expanding, double wedge variety, or solid spacers. The line may be composed by hand or by any suitable mechanism. The mold, variable in width to correspond with the length of the respective words and adjacent spaces, may be of any suitable construction, and may be adjusted by hand or by any appropriate mechanism.

Referring to the drawings; Figure 1 is a perspective view illustrating in outline one form of mechanism which may be employed in carrying my method into effect. Fig. 2 is a perspective view showing a series of justified logotypes such as are produced by my method.

Referring to the drawings; A, A, represent a series of single letter matrices similar to those used in the ordinary linotype machines, each containing in one edge an intaglio character or matrix proper; B, B, are a series of expanding spacers, each consisting of two oppositely tapered wedges, connected by sliding joints so that by moving the longer wedge past the shorter the original thickness of the spacers in the line may be increased to elongate the line and effect justification.

The matrices are assembled side by side in the line in the order in which their characters are to appear in print, and the spacers are inserted between the word groups of matrices and adjusted subsequent to the composition of the line until the latter is elongated to the proper length between the confining jaws or abutments, C, C.

The mold consists of upper and lower members, D, D', shouldered and overlapped in such manner as to present between them the mold cavity, $d$, the length of which may be varied by moving one of the members in relation to the other.

After the line is composed and justified, it is moved along the mold, or the mold is moved along the line, so as to present the mold cavity opposite the successive words, the mold being adjusted each time to a length equal to that of the particular word to which it is presented plus the width of the adjacent spacer on one side. Each time the mold is thus presented it is filled with type metal or equivalent material, which forms a slug or logotype such as shown at E, E', etc. Each logotype except that at one end of the line will present on one end the type-characters $e$, represented by the word group and also a blank, $e'$, extending laterally beyond the type characters.

Owing to the fact that the line is originally justified, and the fact that the word groups of matrices and spacers are used for determining the adjustment of the mold, it follows that the logotypes cast in the method above described will when assembled form a justified line exactly equal in length to the composed line of matrices.

For mechanical reasons, that is to say, for the purpose of giving a bearing for the mold, the spaces between the words may all be increased in width a definite and uniform amount beyond the width necessary for justification of the line. In this case this additional space is ignored in casting the logotypes, each logotype being only of the length of each word plus a space sufficient to justify the line.

I am aware that it is old to compose an unjustified line of matrices and spacers and to utilize the shortage of such line to aid in adjusting the length of a mold to which the detached word groups of matrices are presented in succession, but this involves the use of complicated mechanism for measuring the line and effecting the mold adjustments to secure justification, and also involves handling the word groups successively.

I am also aware that a patent has suggested or described composition and justification of a line of matrices in which the justification is effected by special spacers with protruding fingers which form sides of a series of temporary molds, the whole line or series of logotypes being cast at one operation into these molds. This patent fails to disclose any mechanism for operating the parts named, and does not disclose an adjustable mold or a line of matrices with spacers which could be presented repeatedly in different positions to a single mold.

I have heretofore received certain patents in which a line of matrices was composed and justified, the line being thereafter divided or separated into sections which were presented successively and separately to a mold, each including a word group of matrices and a spacer, but this operation involved the employment of special mechanism and demanded extreme precision in the construction and operation of the parts to insure proper lengths of the logotypes. By the use of the integral justified line, that is to say, the presentation of this unbroken line repeatedly in different relations to the one mold, I am enabled to cast the logotypes in rapid succession and with extreme accuracy, and without the complicated mechanism heretofore required for separately handling the word groups after the line has been divided or disorganized.

I believe myself to be the first to provide for casting logotypes of predetermined length, that is, of such length as to justify the lines, one at a time, from a continuous or unbroken justified line of matrices.

Having described my invention, what I claim is:

1. The method of producing a line of justified logotypes consisting in the following steps: first, assembling in the required order individual matrices representing the characters admissible to the line; second, justifying the composed line to a predetermined length; third, casting against the different portions of the integral line, one after another, logotypes, each including the characters in one word-group of matrices and the adjacent space.

2. The method of producing a series of logotypes to form a justified line consisting in the following steps: first, assembling in the required order individual matrices representing the characters admissible to the line; second, adjusting between the word-groups of matrices spaces of suitable width to justify the line to a predetermined length; third, presenting to the word-groups of matrices in the integral line in succession a mold adjusted to the length of the respective groups plus the width of the adjacent space, if any, and casting in said mold, one at a time, the successive logotypes; whereby the logotypes are produced with the justified spaces integral therewith.

3. The method of producing a series of logotypes to form a justified line consisting in casting said logotypes successively against a composed, justified line of matrices, each logotype being cast against a word-group of matrices and the adjacent space, if any.

4. The method of producing a series of logotypes to form a justified line, consisting in the following steps: first, assembling in proper order the matrices representing all the characters admissible to the line; second, adjusting between the word groups of matrices spaces adapted to give the line a predetermined length; third, presenting to the word groups of matrices in succession in the integral line a mold corresponding to the width of that group and the adjacent space; fourth, casting in said mold, one at a time, logotypes corresponding to the successive word groups and the adjacent justifying spaces.

In testimony whereof I hereunto set my hand this 18th day of December, 1906, in the presence of two attesting witnesses.

PHILIP T. DODGE.

Witnesses:
 E. J. LAMB,
 WALTER MOBLARD.